United States Patent [19]

McVey

[11] Patent Number: 4,715,632
[45] Date of Patent: Dec. 29, 1987

[54] RECEIVING AND LIFTING DEVICE FOR GROUND OR FLOOR OBJECTS

[76] Inventor: Kenneth McVey, Paulsen Medical/Dental Building, Spokane, Wash. 99201

[21] Appl. No.: 909,948

[22] Filed: Sep. 22, 1986

[51] Int. Cl.⁴ ............................................. A63B 47/02
[52] U.S. Cl. .................................... 294/19.1; 294/19.2
[58] Field of Search ...................... 294/19.2, 19.1, 50, 294/50.6, 24, 2, 10, 14, 20; 56/328 R, 400.04, 400.11, 400.19; 273/32 F, 162 E

[56] References Cited

U.S. PATENT DOCUMENTS

| | | |
|---|---|---|
| 2,972,851 | 2/1961 | Goehring .......................... 294/19.2 |
| 3,997,169 | 12/1976 | Bergstrom .......................... 294/19.2 |
| 4,216,831 | 8/1980 | Ritchie .............................. 294/19.2 |

Primary Examiner—James B. Marbert
Attorney, Agent, or Firm—Wells, St. John & Roberts

[57] ABSTRACT

A device for manually lifting ground or floor objects is presented by a pair of transversely spaced walls with flexible lower fingers that are capable of being pushed outwardly and under an object as they are manually pushed over the object, without requiring bending or stooping movement by the user. The walls converge from one end of the device to the other to facilitate release of the object after it has been lifted from the ground or floor.

2 Claims, 7 Drawing Figures

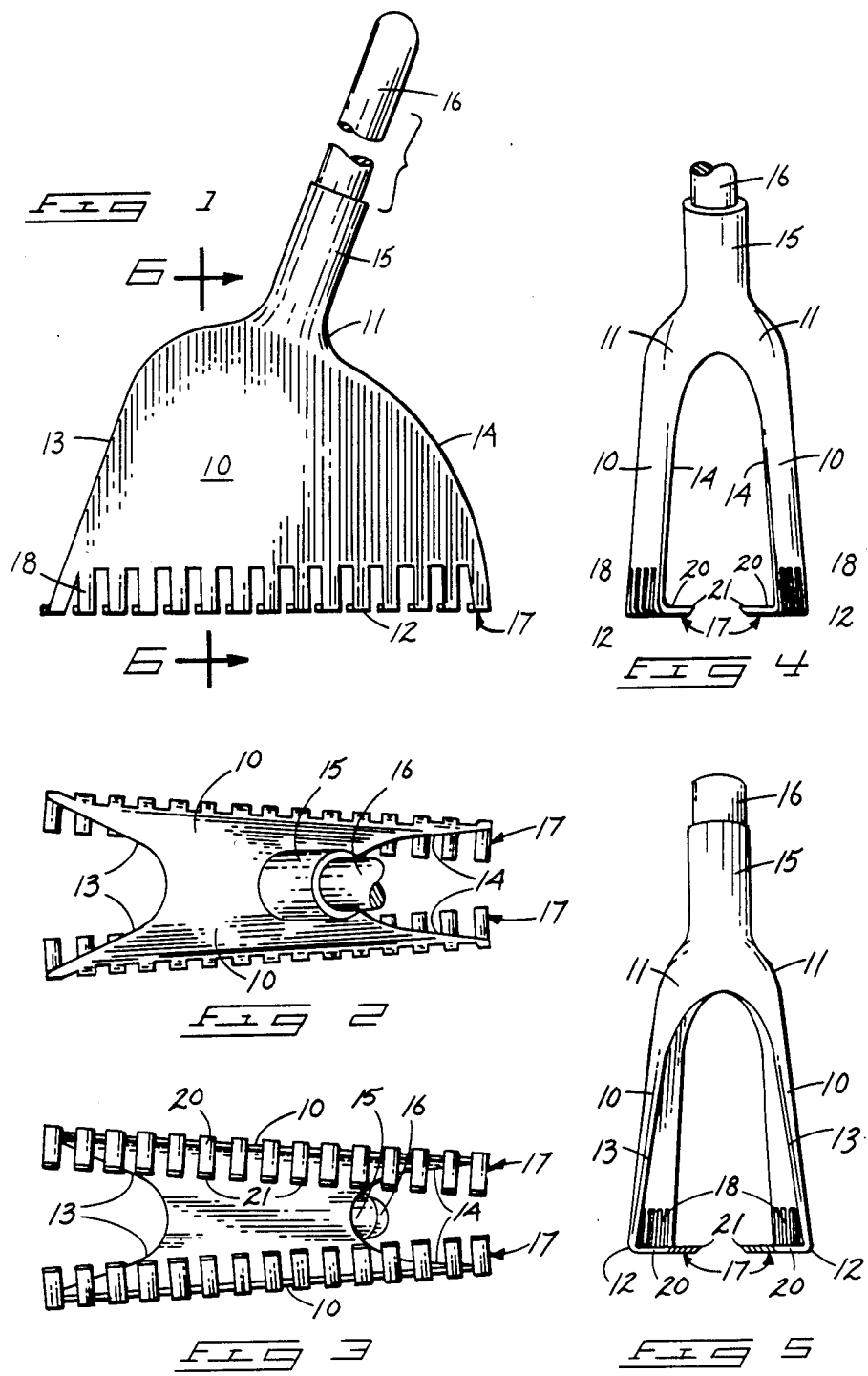

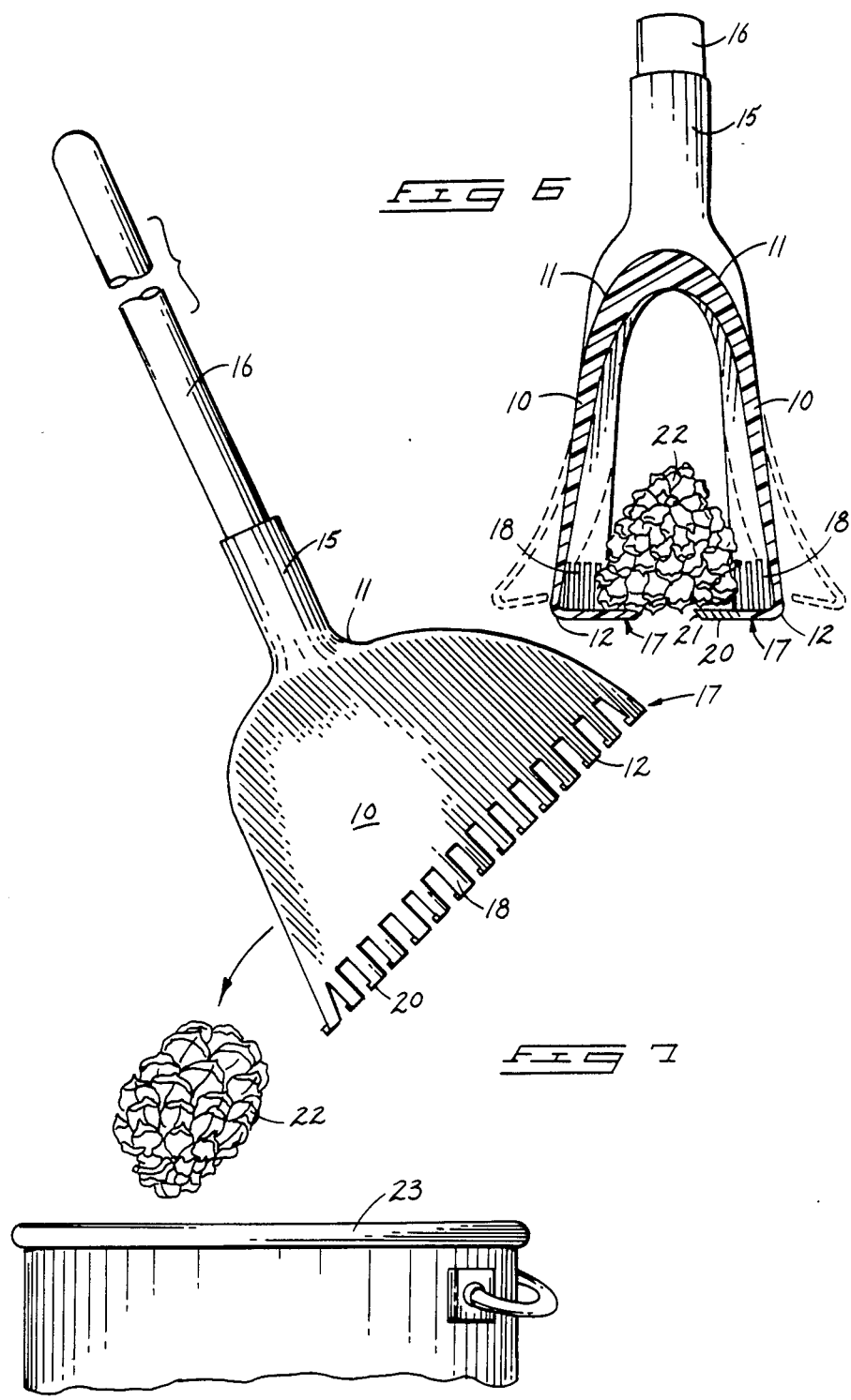

RECEIVING AND LIFTING DEVICE FOR GROUND OR FLOOR OBJECTS

TECHNICAL FIELD

This disclosure relates to a manual device for assisting a user when lifting objects from a ground or floor surface.

BACKGROUND OF THE INVENTION

The present invention arose from recognition of a need to assist people who are maintaining lawns where pinecones drop from nearby trees. Clearing a lawn of such cones is a prerequisite to mowing the lawn and maintaining the usual desired clean appearance of the lawn. This is typically accomplished by manually removing the individual cones from the lawn, since their size, weigh and rough texture make it impractical to remove them by raking or sweeping. The bending or stooping action required to manually pick up the cones is uncomfortable to many people and is impossible to others, particularly those who are elderly. The present device was designed to permit individual cones to be manually lifted from the ground surface without stooping.

While designing specifically for pinecones, this device is equally applicable to the lifting of other three dimensional ground or floor objects which might be found freely resting on a ground or floor surface in an individual manner, as opposed to being in a stack or pile. Such objects might include various natural objects, such as cones, fruits or nuts which have dropped from a tree, as well as man-made objects, such as tennis balls, baseballs or golf balls. As will be evident from the following disclosure, the device is capable of receiving and lifting a wide range of three dimensional objects having a relatively solid outside configuration.

BRIEF DESCRIPTION OF THE DRAWINGS

The preferred embodiment of the invention is illustrated in the accompanying drawings, in which:

FIG. 1 is a side elevation view of the device with a section of a handle broken away;

FIG. 2 is a top view with the handle shown broken away adjacent to the device;

FIG. 3 is a bottom view;

FIG. 4 is a back view;

FIG. 5 is a front view;

FIG. 6 is an enlarged sectional view taken along line 6 in FIG. 1, showing a pinecone received within the device; and FIG. 7 is an elevational view showing deposit of a pinecone from the device into a receptacle.

DETAILED DESCRIPTION OF THE PREFERRED EMBODIMENT

In compliance with the constitutional purpose of the Patent Laws "to promote the progress of science and useful arts" (Article 1, Section 8), applicant submits the following disclosure of the invention.

This disclosure relates to a device to facilitate manual lifting of three dimensional objects, such as pinecones, from a ground or floor surface. The device includes a pair of transversely spaced upright walls 10. Each wall 10 is bounded by an upper end 11 and a lower end 12 extending between a front edge 13 and an upright unobstructed back edge 14. The walls 10 are arranged in nnon-parallel side-by-side positions and are joined to one another across their upper ends 11. Protruding outward from the joined upper ends 11 of the walls 10 is a handle socket 15 that receives the lower end of a cylindrical handle 16. Handle 16 can be of any length suitable for facilitating manual movement of the walls 10 to permit reception of a ground or floor object between them without requiring bending or stooping motion by the user.

The lower ends 12 of the spaced walls 10 are each provided with a row of inwardly protruding resilient fingers 17 projecting partially across the space separating the walls 10. The two rows of fingers 17 are adapted to engage beneath the ground or floor object. They are moved apart and together as the inner ends of the rows of fingers 17 slide over the exterior surfaces of an object as the device is moved downwardly over it. The temporary resulting deflection of the rows of fingers 17 is illustrated in dashed lines in FIG. 6 with respect to a typical pinecone 22.

Each row of fingers 17 includes a plurality of parallel fingers spaced evenly between the front and back edges 13, 14 of the wall 10 on which they are integrally formed. Each finger is bent and includes a first section 18 formed as a lower extension of a wall 10 and a second section 20 bent inwardly and directed toward the other wall.

In the preferred form of the invention, the fingers terminate at inner finger ends 21 which are transversely spaced apart from one another across the two walls 10. To facilitate reception of ground or floor objects between the walls 11, the respective lower ends 12 of the walls 10 are shown as being straight and coplanar. This permits the lower ends 12 of walls 10 to engage elongated areas of a ground or floor surface on which an object is resting. The straight and coplanar nature of the lower ends 12 also facilitates placement of the rows of fingers 17 beneath an object resting on the ground or floor surface, as generally illustrated in FIG. 6.

While it is not essential to the invention, the walls 10, handle socket 15 and rows of fingers 17 are preferably integrally molded from a resilient plastic material. This permits the device to be manufactured economically and facilitates the required flexing of the rows of fingers 17 to receive a ground or floor object between the walls 10. The resilient material must be capable of permitting the rows of fingers 17 to flex apart and together as the inner ends of the fingers slide over the exterior of an object to be lifted. The resilience of the rows of fingers 17 causes them to return to their normal positions under the object, thereby readying the object to be lifted from the ground or floor surface for deposit into a waiting bucket or receptacle 23 (FIG. 7).

To facilitate release of an object from between the walls 10 after it has been lifted by use of this device, the two walls 10 are positioned in a slightly converging orientation with respect to one another. More specifically, the transverse spacing between the front edges 13 is greater than that between the back edges 14. As can be seen in FIG. 3, this convergence also results in a progressive variation between the transverse space separating the inner ends of the opposed rows of fingers 17. Therefore, when the device is tilted forwardly as shown in FIG. 7, the pinecone 22 or other objects lifted by the device will be freed to fall gravitationally between the front edges and into a waiting receptacle 23.

The present device can take many different physical forms while maintaining the general functional relationship just described. For instance, the device could be fabricated from the resilient metal bent or assembled to present a pair of spaced walls and flexible lower fingers. Also, the lowermost section of the fingers need not be coplanar across the device. They might be angularly directed upward toward the opposing wall. The configurations of the front and back edges of the two walls and the degree of convergence between them can also be varied to meet specific applications and objects with which the device is designed to be used.

In compliance with the statute, the invention has been described in language more or less specific as to structural features. It is to be understood, however, that the invention is not limited to the specific features shown, since the means and construction herein disclosed comprise a preferred form of putting the invention into effect. The invention is, therefore, claimed in any of its forms or modifications within the proper scope of the appended claims, appropriately interpreted in accordance with the doctrine of equivalents.

I claim:

1. A manually useable device for receiving and lifting three-dimensional objects freely resting on a ground or floor surface in an individual manner, comprising:
    a pair of transversely spaced upright walls having upper and lower ends extending between upright, unobstructed front and back edges, the walls being arranged in non-parallel, converging side-by-side positions and being joined to one another across their respective upper ends;
    handle means extending upwardly from the joined upper ends of the walls for facilitating manual positioning of the walls relative to a ground or floor surface without bending or stooping movement by a user;
    the respective lower ends of the walls being provided with a row of inwardly protruding resilient fingers projecting partially across the space separating the walls, the inner ends of the fingers in one row being normally transversely spaced apart from the inner ends of the fingers in the remaining row and being adapted to engage beneath an object on a ground or floor surface when the walls are moved apart and together as the fingers slide over exterior surfaces of the object while the device is moved downwardly over it;
    the pair of walls being spaced apart a greater distance at their front edges than at their back edges to free an object lifted within the device to fall gravitationally between the front edges of the walls and into a waiting receptacle when the device is tilted forwardly.

2. The device of claim 1 wherein the transverse spacing between the inner ends of the fingers in the two rows is progressively increased from the back ends of the respective walls to their front ends.

* * * * *